United States Patent [19]
Abramson

[11] Patent Number: 6,134,625
[45] Date of Patent: Oct. 17, 2000

[54] METHOD AND APPARATUS FOR PROVIDING ARBITRATION BETWEEN MULTIPLE DATA STREAMS

[75] Inventor: Darren L. Abramson, Folsom, Calif.

[73] Assignee: Intel Corporation, Santa Clara, Calif.

[21] Appl. No.: 09/027,136

[22] Filed: Feb. 18, 1998

[51] Int. Cl.[7] .................................................. G06F 13/00
[52] U.S. Cl. ................................... 710/241; 710/129
[58] Field of Search .................................. 370/252, 462, 370/461; 710/100, 107–109, 110, 112, 113, 119, 114, 115, 116, 117, 120, 121, 122, 123, 124, 129, 126, 240, 241

[56] References Cited

U.S. PATENT DOCUMENTS

| | | | |
|---|---|---|---|
| 5,983,301 | 11/1999 | Baker et al. ............................ | 710/113 |
| 5,987,555 | 11/1999 | Alzien et al. ............................ | 710/129 |
| 5,991,304 | 11/1999 | Abramson ................................ | 370/413 |
| 5,991,520 | 11/1999 | Smyers et al. .......................... | 710/100 |
| 6,032,211 | 2/2000 | Hewitt ..................................... | 710/107 |

*Primary Examiner*—Glenn A. Auve
*Attorney, Agent, or Firm*—Blakely, Sokoloff, Taylor & Zafman LLP

[57] ABSTRACT

A method of arbitrating between first and second data streams is disclosed. The method includes the steps of detecting a first type of request and a second type of request and if the first type of request is for a write operation, performing the write operation in response to the first type of request. If the second type of request is for a write operation, performing the write operation in response to the second type of request, otherwise performing a read operation in response to the first type of request.

20 Claims, 8 Drawing Sheets

METHOD AND APPARATUS FOR PROVIDING ARBITRATION BETWEEN MULTIPLE DATA STREAMS

BACKGROUND OF THE INVENTION

1. Field of the Invention

The present invention relates generally to the field of computer systems, and specifically, to a method and apparatus for arbitrating between multiple data streams.

2. Background Information

Recently, high speed serial buses have become more and more popular in computer systems because of their low cost and high performance. A serial bus is connected to a high speed bus (such as the peripheral component interconnect "PCI" bus) by way of a bus bridge. The serial bus typically transmits different data streams such as asynchronous and isochronous data streams. Transmission of asynchronous data streams places emphasis on guaranteed delivery of data over guaranteed timing whereas transmission of isochronous data streams places emphasis on guaranteed timing of data over delivery. To support both asynchronous and isochronous data streams, the bus bridge includes an internal arbitration unit to select between the different data streams. Typically, the arbitration unit waits until a receive first-in/first out device ("FIFO") is almost full or a transmit FIFO is almost empty prior to asserting a request to access the PCI bus. The arbitration unit uses a simple, rotating priority scheme which rotates priority between the asynchronous and isochronous data streams. This type of arbitration scheme makes inefficient use of the PCI bus.

Accordingly, there is a need in the technology for a method and apparatus to provide an efficient arbitration mechanism between multiple data streams and a bus.

SUMMARY OF THE INVENTION

In one embodiment, the present invention is a method of arbitrating between first and second data streams. The method includes the steps of detecting a first type of request and a second type of request and if the first type of request is for a write operation, performing the write operation in response to the first type of request. If the second type of request is for a write operation, performing the write operation in response to the second type of request, otherwise performing a read operation in response to the first type of request.

BRIEF DESCRIPTION OF THE DRAWINGS

The features and advantages of the present invention will become apparent from the following detailed description of the present invention in which.

DESCRIPTION OF THE PREFERRED EMBODIMENT

In the following description, for purposes of explanation, numerous details are set forth in order to provide a thorough understanding of the present invention. However, it will be apparent to one skilled in the art that these specific details are not required in order to practice the present invention. As discussed herein, a "computer system" is a product including circuitry capable of processing data. The computer system may include, but is not limited or restricted to, a conventional computer (e.g., laptop, desktop, palmtop, server, mainframe, etc.), hard copy equipment (e.g., printer, plotter, scanner, fax machine, etc.), banking equipment (e.g., an automated teller machine), wireless communication equipment, and the like.

Figure 1:
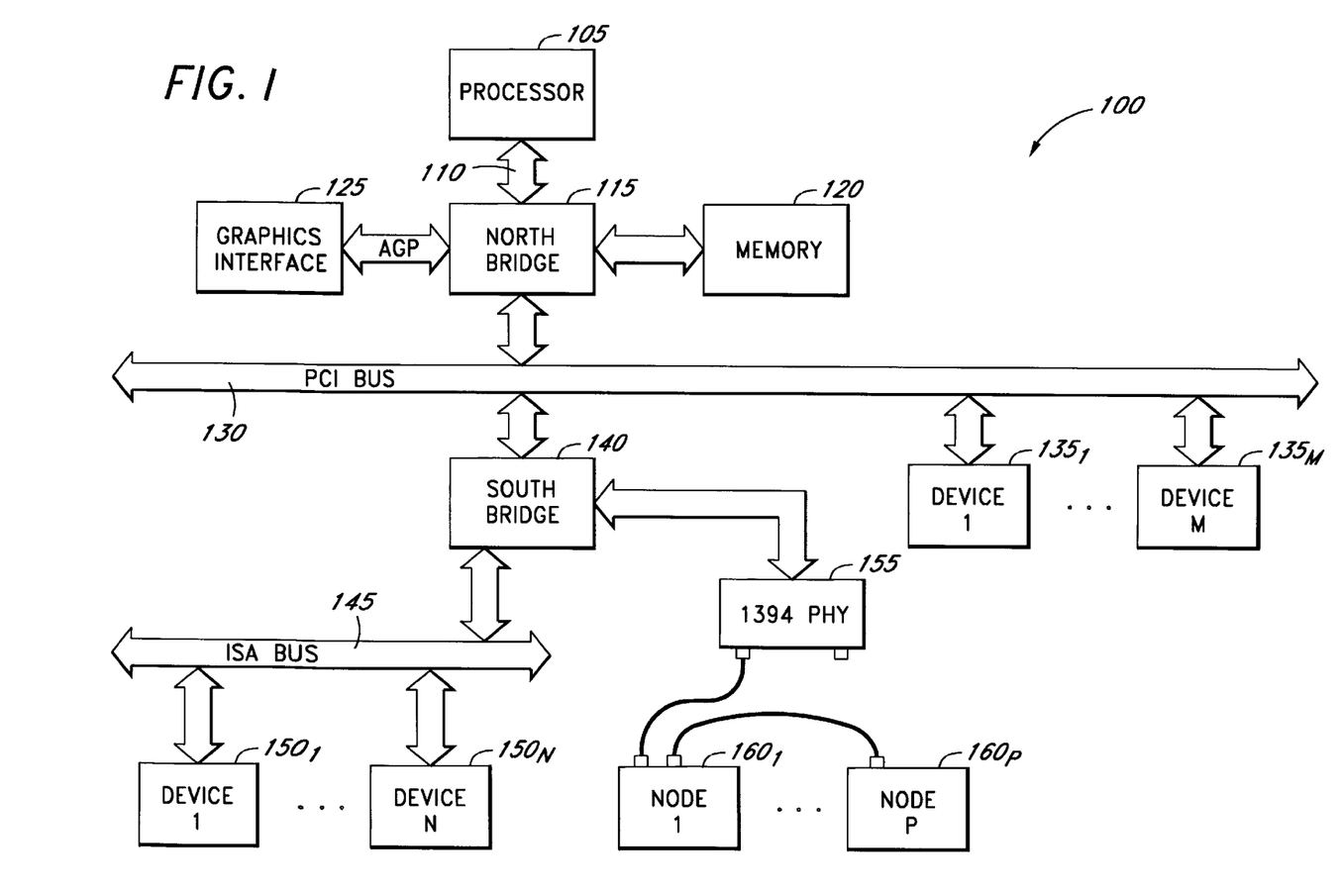
FIG. 1 illustrates an exemplary computer system suitable for use with the present invention.

FIG. 1 illustrates an exemplary computer system 100 suitable for use with the present invention. The computer system 100 includes a processor 105 coupled to a host bridge 115 (hereinafter referred to as a "north bridge") by way of host bus 110. Processor 105 may be any type of processor such as a microcontroller or a general purpose microprocessor. In the embodiment shown, the north bridge 115 is a host to peripheral component interconnect ("PCI") bridge, although other bridges may be used in lieu thereof. The north bridge 115 is coupled to system memory 120 (e.g., dynamic random access memory "DRAM", static RAM "SRAM", etc.), PCI bus 130, and a graphics interface 125. The north bridge 115 is responsible for bridging processor transactions to either system memory 120, PCI bus 130, or graphics interface 125. The north bridge 115 also bridges graphics interface 125 or PCI mastered transactions to system memory 120 while initiating processor 105 cache snoop cycles. In the preferred embodiment, the north bridge 115 is also the PCI arbiter. However, it is contemplated that another agent may contain the PCI arbiter. The north bridge 115 is capable of holding a PCIGNT# asserted such that a master agent may initiate multiple PCI bus transactions within a single arbitration cycle.

The PCI bus 130 provides a communication path between processor 105 or system memory 120 and one or more peripheral devices $135_1$–$135_M$ (e.g., a network interface card, a SCSI controller card, etc.), where "M" is a positive whole number. The PCI bus 130 further provides a communication path between the processor 105 or system memory 120 and a second bridge 140 (hereinafter referred to as a "south bridge").

In one embodiment, the south bridge 140, among other things, serves two major purposes. First, the south bridge 140 bridges transactions between the PCI bus 130 and an expansion bus 145. In the embodiment shown, the expansion bus 145 is an industry standard architecture ("ISA") bus, although any other type of bus architecture may be used in lieu thereof. The expansion bus 145 provides a communication path between the PCI bus 130 and a plurality of expansion peripheral devices $150_1$–$150_N$ (e.g., a disk drive controller, a sound card, a modem, a serial and parallel port controller, etc.), where "N" is a positive whole number.

Second, the south bridge 140 bridges transactions from the PCI bus 130 and a serial bus 160. In the preferred embodiment, the serial bus is a 1394 serial bus in accordance with "IEEE 1394–1995 High Performance Serial Bus" published in 1995, although any other serial bus architecture may be used. The south bridge 140 is coupled to a 1394 physical interface 155. The physical interface 155 is coupled to a plurality of nodes $160_1$–$160_P$ (where "P" is a positive whole number) by way of the 1394 serial bus. It is to be appreciated by one skilled in the art that the specific architecture of the computer system 100 is not critical in practicing the present invention, as variations may be made to the computer system 100 without departing from the spirit and scope of the present invention.

Figure 2:
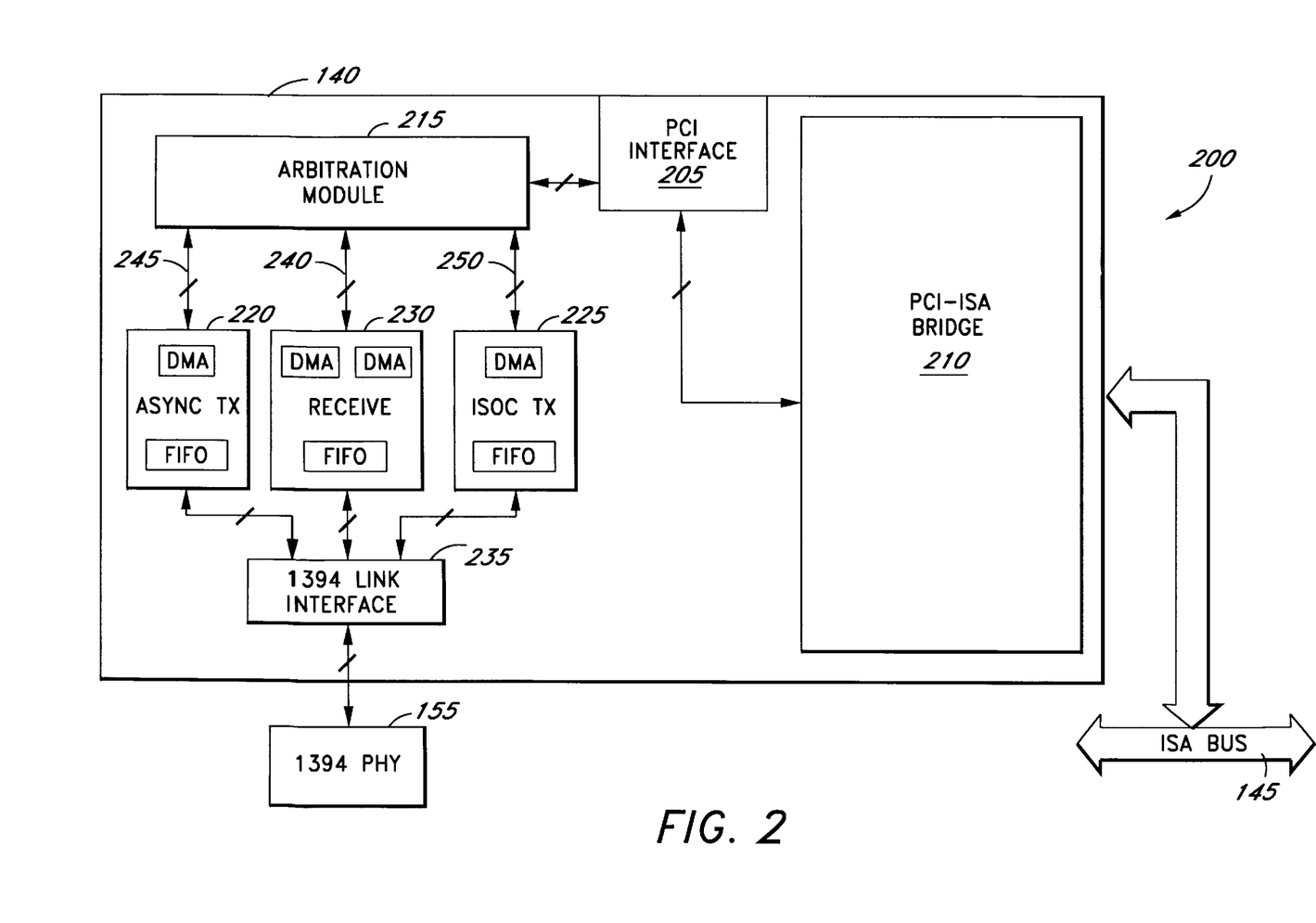
FIG. 2 illustrates an exemplary embodiment of the south bridge in accordance to the teachings of the present invention.

FIG. 2 illustrates an exemplary embodiment of the south bridge 140 in accordance to the teachings of the present invention. Referring to FIGS. 1 and 2, the south bridge 140 includes a PCI interface module 205 which interfaces with a PCI-to-ISA bridge 210 and an arbitration module 215. The PCI-to-ISA bridge 210 allows transactions between one or more expansion peripheral devices $150_1$–$150_N$ and devices coupled to the PCI bus 130, processor 105, and system memory 120. The arbitration module 215 is coupled to asynchronous transmit module 220 (referred to as "ATX module") by way of signal lines 245, isochronous transmit module 225 (referred to as "ITX module") by way of signal lines 250, and receive module 230 by way of signal lines 240. The arbitration module 215 performs the necessary arbitration between ATX, ITX, and receive modules 220, 225, and 230 to access the PCI bus 130.

Furthermore, the ATX, ITX, and receive modules 220, 225, and 230 are coupled to a 1394 link interface 235 which provides the necessary interface to the 1394 serial bus. The 1394 link interface 235 serializes and de-serializes data streams. For example, the 1394 link interface 235 translates data buses having different data widths (e.g., quadlet to byte bus width translations). The 1394 link interface 235 is coupled to the physical link interface 155 which is connected to the 1394 serial bus.

The ATX module 220 transmits asynchronous data packets to serial peripheral devices on the 1394 serial bus while the ITX module 225 transmits isochronous data packets to serial peripheral devices on the 1394 serial bus. The receive module 230, on the other hand, receives both asynchronous and isochronous data packets from serial peripheral devices on the 1394 serial bus. In another implementation, separate asynchronous and isochronous receive modules may be used. Asynchronous transmission of data places emphasis on guaranteed delivery of data over guaranteed timing whereas isochronous transmission of data places emphasis on guaranteed timing of data over delivery of data. An example of an isochronous serial peripheral device is a digital camera used for video conferencing. Although the present invention is described with respect to asynchronous and isochronous data streams, the arbitration mechanism of the present invention applies to other types of data streams. In fact, the arbitration mechanism applies to similar (e.g., two asynchronous data streams) as well as different data streams.

Figure 3:
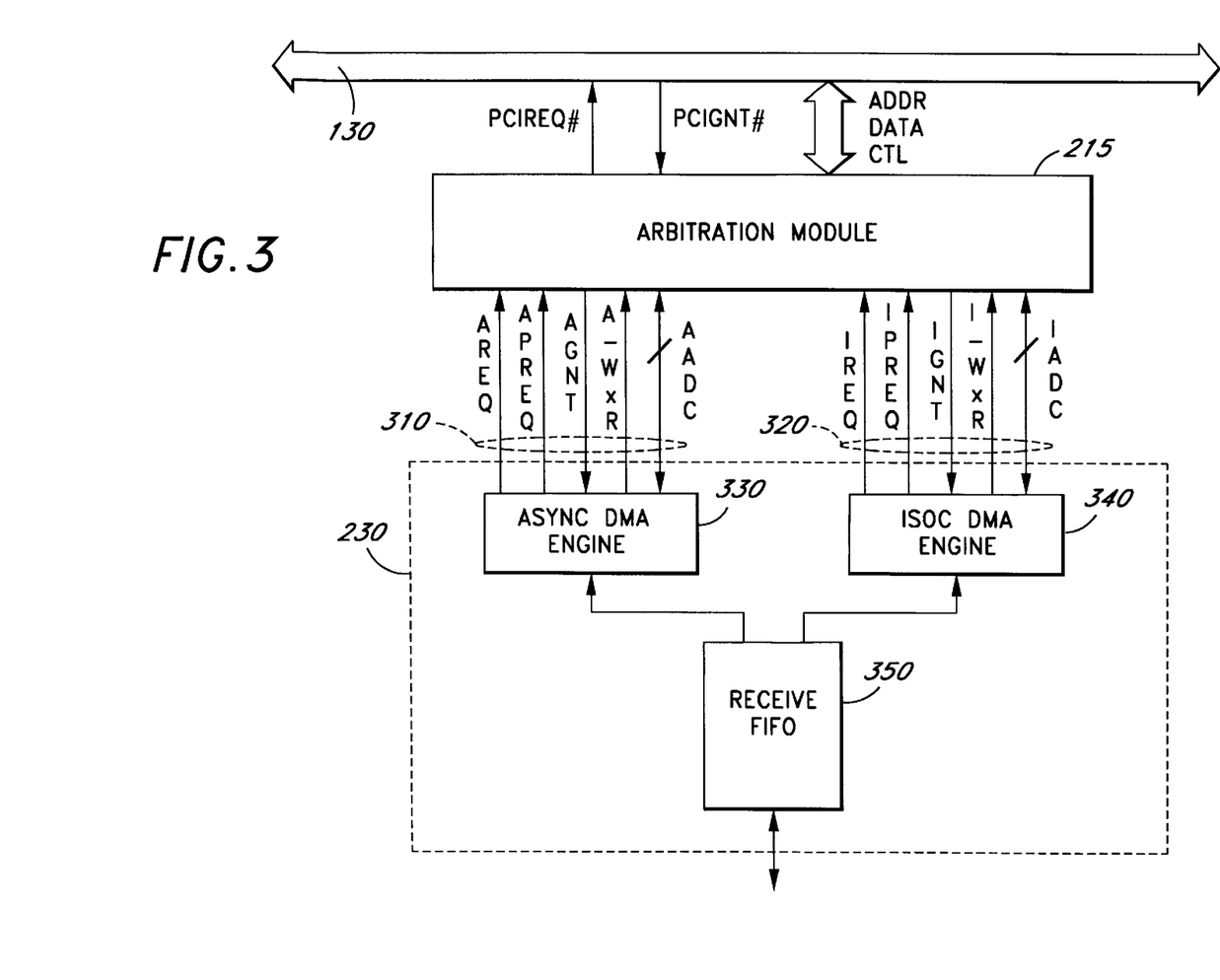
FIG. 3 illustrates an exemplary interconnection between an arbitration module and asynchronous and isochronous DMA engines.

FIG. 3 illustrates an exemplary interconnection between an arbitration module 215 and asynchronous and isochronous DMA engines 330 and 340. In the preferred embodiment, the operation of the arbitration module 215 is described in connection with a PCI bus, although the arbitration module 215 may operate with any other bus architecture. The arbitration module 215 assigns priority among asynchronous requests and isochronous requests based on the urgency and type (read/write) of request. The arbitration module 215 provides, among other things, the following functionality: (1) An ability to preempt a lower priority request in order to service a higher priority request; (2) An ability to prioritize writes over reads during a first PCI bus transaction (or access) following a PCI grant (within an arbitration cycle); and (3) An ability to prioritize isochronous data streams over asynchronous data streams.

Referring to FIGS. 2 and 3, the arbitration module 215 is coupled to the PCI bus 130 by way of address, data, and control signal lines including PCIREQ# and PCIGNT# signal lines. The arbitration module 215 is coupled to the asynchronous DMA engine 330 (hereinafter referred to as "async DMA engine") by way of signal lines 310 and to the isochronous DMA engine 340 (hereinafter referred to as "isoc DMA engine") by way of signal lines 320, both of which are coupled to a receive FIFO 350 and are contained in the receive module 230. The signal lines 310 and 320 correspond to the signal lines 240 of FIG. 2. It is to be noted that the arrangement of FIG. 3 is merely exemplary and not intended as a restriction of the present invention. To that end, it is contemplated that the async DMA engine 330 may be contained in another device such as in the ATX module 220, in which case signal lines 310 correspond to signal lines 245 of FIG. 2 and the isoc DMA engine 340 may be contained in the ITX module 225, in which case signal lines 320 correspond to signal lines 250 of FIG. 2. The async and isoc DMA engines 330 and 340 are independent of each other and may be active concurrently.

In particular, signal lines 310 include asynchronous (i) request ("AREQ"), (ii) priority request ("APREQ"), (iii) grant ("AGNT"), (iv) write/read ("A_W×R"), and (v) address, data, and control ("AADC") signal lines. Correspondingly, signal lines 320 include isochronous (i) request ("IREQ"), (ii) priority request ("IPREQ"), (iii) grant ("IGNT"), (iv) write/read ("I_W×R"), and (v) address, data, and control ("IADC") signal lines. The async DMA engine 330 asserts AREQ and/or the isoc DMA engine 340 asserts IREQ for a normal request to access the PCI bus 130 in response to, for example, asynchronous data and/or isochronous data, respectively, to be drained from the receive FIFO 350. The DMA engines perform other tasks besides draining the receive FIFO 310 such as, among other things, fetching commands (or command descriptors) from memory, writing-back status information to memory, and any other non-FIFO related functions. Furthermore, the async DMA engine 330 asserts the APREQ signal for a priority request to access the PCI bus 130 in response to a higher priority request. Similarly, the isoc DMA engine 340 asserts the IPREQ signal for a priority request to access the PCI bus 130 in response to a higher priority request. The APREQ and the IPREQ signals are mutually exclusive signals in that both are never asserted at the same time. One condition, among a myriad of conditions, for requesting a higher priority request is described in co-pending U.S. Patent Application entitled "Method and Apparatus for Dynamically Changing Draining Priority of a Receive FIFO Based on a Programmable Quadlet Count Watermark" by Abramson et al., and which is assigned to the assignee of the present invention.

Figure 4A:
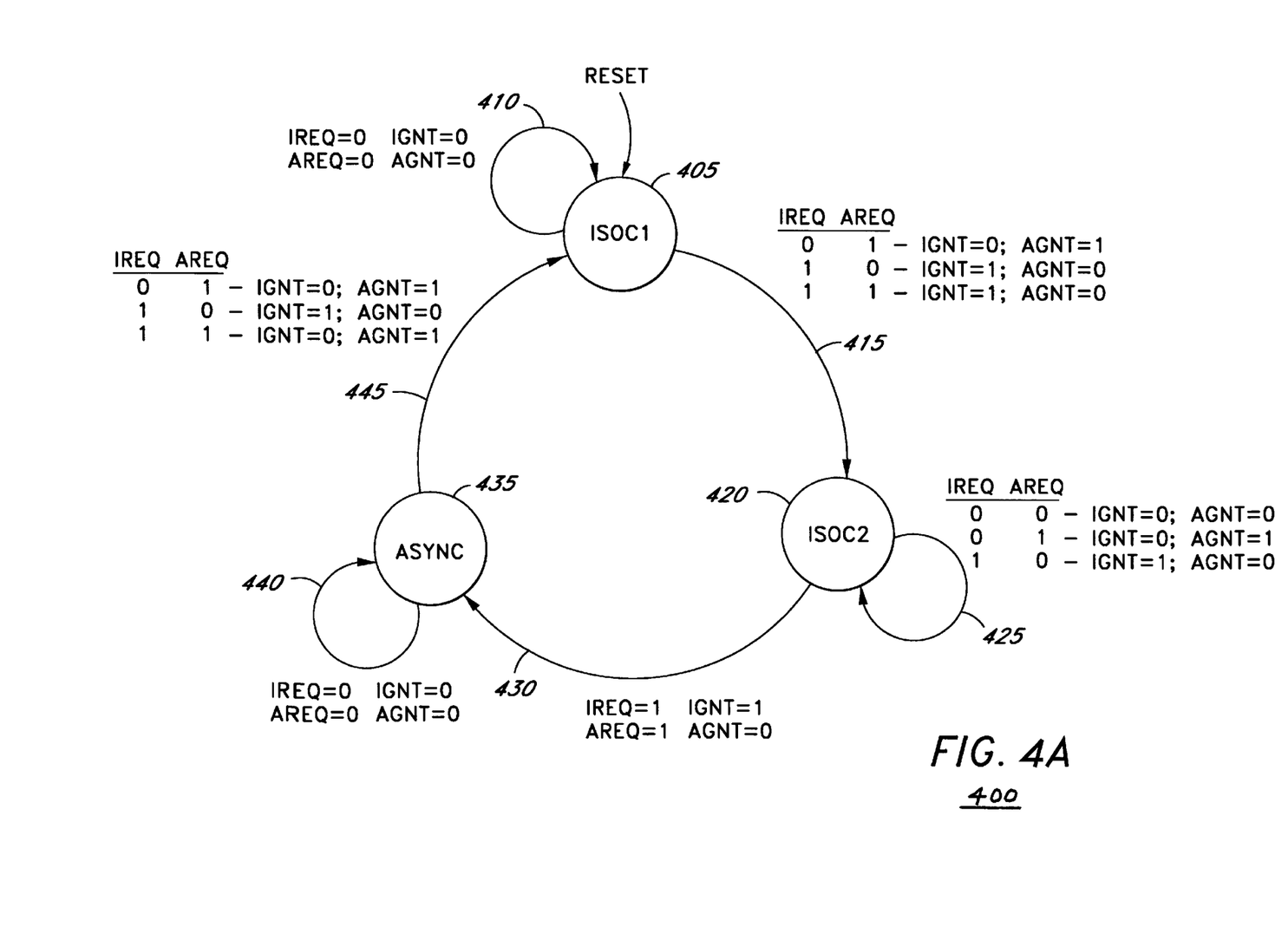
FIG. 4A is a state diagram illustrating one embodiment of a priority solver for arbitrating between asynchronous and isochronous data streams.
Figure 4B:
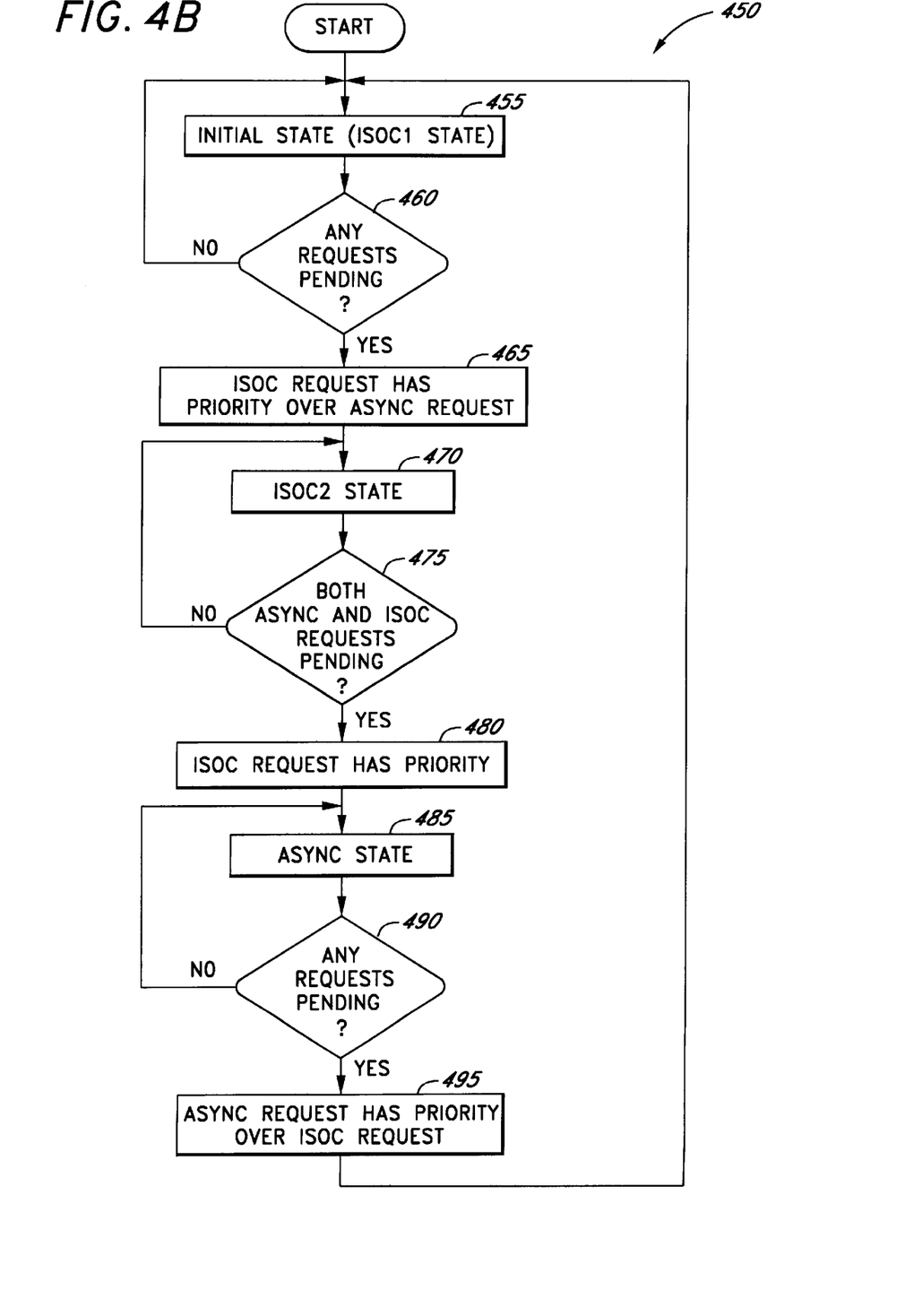
FIG. 4B is a flow diagram illustrating one embodiment of a priority solver process for arbitrating between asynchronous and isochronous data streams.

FIG. 4A is a state diagram illustrating one embodiment of a priority solver 400 for arbitrating between asynchronous and isochronous data streams. Correspondingly, FIG. 4B is a flow diagram illustrating one embodiment of a priority solver process 450 for arbitrating between asynchronous and isochronous data streams. The process 450 of FIG. 4B is representative of a software emulation of the priority solver 400. The priority solver 400 illustrates the third functionality provided by arbitration module 215. The winner of a grant is based on any one priority request (either APREQ or IPREQ) being asserted. If only normal requests are asserted (i.e., AREQ or IREQ), the winner of a grant is determined by the priority solver 400 and the priority solver process 450. The priority solver grants an isochronous request (hereinafter referred to as "isoc request") priority over an asynchronous request (hereinafter referred to as "async request") in two of three states. This is because isochronous data requires guaranteed timing and if an isochronous packet is lost, it cannot be retried or recovered. On the other hand, asynchronous data packets can be re-transmitted if the data packets are lost.

Now referring to FIGS. 4A and 4B, an ISOC1 state 405 is the power-on-reset or initial state. This state corresponds to Step 455. If there are no requests at state 405, the state remains the same, as shown by arrow 410. If there is an async request or an isoc request, the async request or the isoc request is granted access to the PCI bus (assuming that PCIGNT# has been asserted by the PCI bus arbiter) as also shown at Step 460. It must be noted that if a single request is asserted, then that request will be granted priority. If both the async and isoc requests are asserted, the isoc request is granted priority (Step 465). In any of these situations where at least one request is asserted, the priority solver 400 rotates to an ISOC2 state 420, as shown by arrow 415 (Step 470). At state 420, if no request or only one request is asserted (async or isoc), the state remains the same as shown by arrow 425 (Step 475). On the other hand, if both async and isoc requests are asserted, the isoc request is granted priority over the async request (Step 480) and the state changes to an ASYNC state 435, as shown by arrow 430 (Step 485).

At the ASYNC state 435, if no requests are asserted, then the state does not change as shown by arrow 440 (Step 490). However, if one or both requests are asserted, the state changes to the ISOC1 state 405 as shown by arrow 445 (Step 455). If both requests are asserted, the async request is granted priority over the isoc request (Step 495). Granting the async request priority over the isoc request in the ASYNC state 435 ensures that an async request is eventually serviced (assuming that the async request remains asserted).

Figure 5:
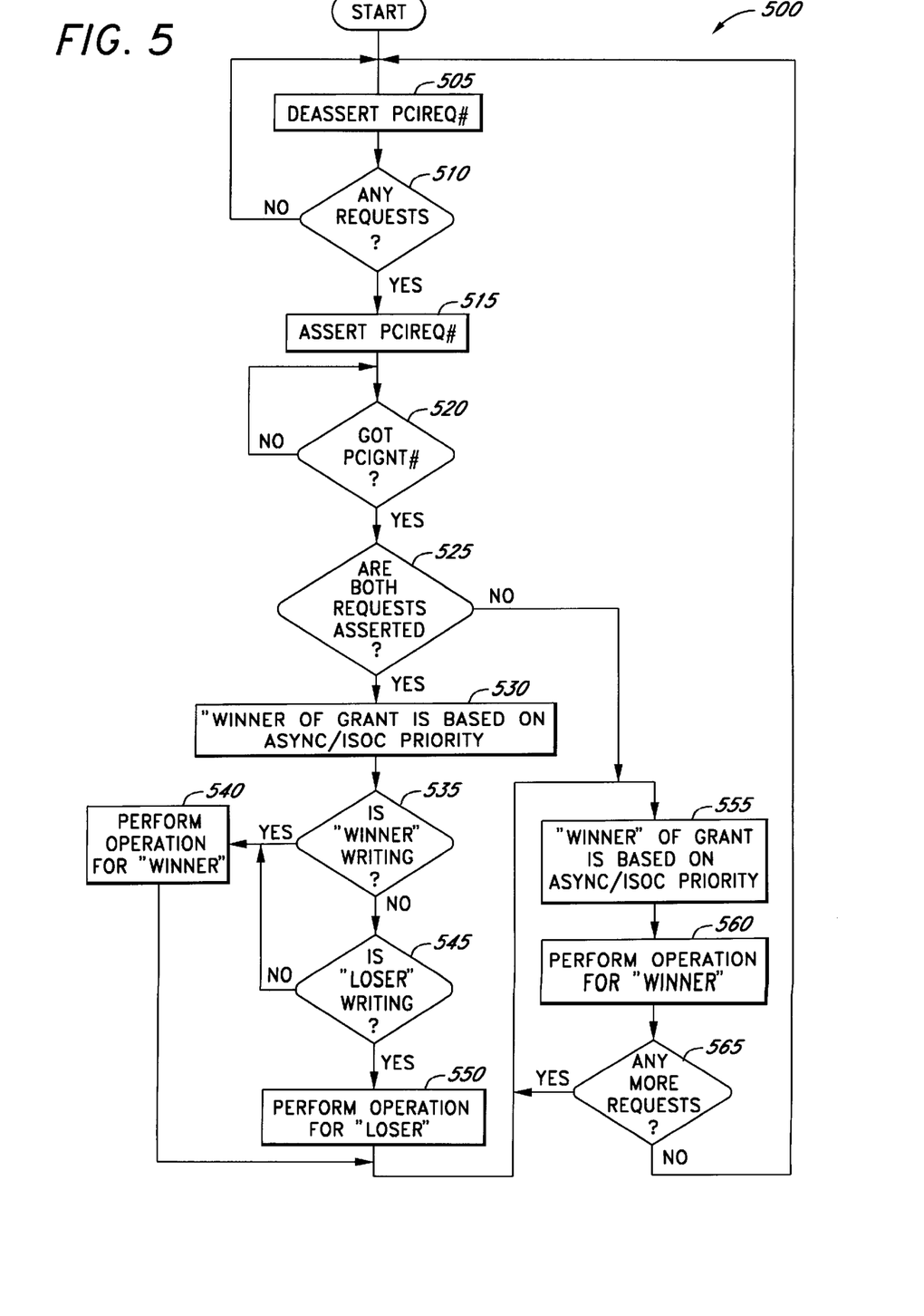
FIG. 5 is a flow diagram illustrating an exemplary process for arbitrating between asynchronous and isochronous data streams.

FIG. 5 is a flow diagram illustrating an exemplary process 500 for arbitrating between asynchronous and isochronous data streams. It is important to note that the process 500 illustrates both the second functionality and the third functionality provided by the arbitration module 215. Moreover, the following description assumes that multiple bus transactions may be performed within the same arbitration cycle without being forced to deassert PCIREQ# prematurely in response to the PCI arbiter deasserting PCIGNT#.

Referring to FIGS. 3 and 5 together, process 500 commences at Step 505 where a PCIREQ# signal is deasserted to indicate that there are no pending requests. At Step 510, a determination is made as to whether a request (async and/or isoc) has been asserted. If no request is asserted, the process waits in a loop until such time that a request is asserted, at which time the process proceeds to Step 515. At Step 515, a PCIREQ# signal is asserted by the arbitration module 215 to access the PCI bus 130. The process then proceeds to Step 520. At Step 520, the process 500 waits for the assertion of PCIGNT# and then continues to Step 525. At Step 525, the process 500 determines whether both requests have been asserted. If both requests have been asserted, the process 500 moves to step 530, otherwise the process 500 moves to Step 555. At Step 530, the "winner" of a grant (either async or isoc) is determined by the priority solver 400 of FIG. 4A. It must be noted that Step 525 may be performed before, after, or at the same time as Steps 515 and 520. The process then proceeds to Step 535.

At Step 535, a determination is made as to whether the "winner" of a grant is writing or reading. If the "winner" is writing, the process moves to Step 540 where the "winner" performs the writing operation, otherwise the process 500 proceeds to Step 545. At Step 545, a determination is made as to whether the "loser" of a grant is writing or reading. If the "loser" is not writing, the process 500 jumps back to Step 540 and the "winner" performs the reading operation, otherwise the process moves to Step 550. At Step 550, the "loser" performs the writing operation. The rationale behind providing Steps 525, 530, 535, 540, 545, and 550 for a first PCI transaction following the start of an arbitration cycle becomes apparent from the next paragraph. The process 500 then continues to Step 555. At Step 555, the "winner" of any pending request under the current arbitration cycle, if any, is based on the priority solver 400 of FIG. 4A. At Step 560, the "winner" performs the operation and the process 500 continues to Step 565. At Step 565, if there are no more requests pending under the current PCIGNT# arbitration cycle, the process 500 moves to Step 505 where PCIREQ# is deasserted (and the PCI arbiter ends the current arbitration cycle). If there are more requests pending, the process 500 moves back to Step 555.

Thus, during the first PCI bus transaction following a PCI grant of an arbitration cycle, where multiple bus transactions can take place, writes can have higher priority than reads. If the PCI arbiter (e.g., the north bridge 115 of FIG. 1) establishes a delayed transaction on the PCI bus on behalf of another agent (e.g., a LAN card) a read operation to memory 120 of FIG. 1 may not be granted and may have to be retried, thus resulting in a loss of arbitration (delayed transactions are described in the PCI Local Bus Specification, Revision 2.1, published in 1995). This reduces the possibility of wasting an arbitration cycle if a PCI read operation is attempted and the system PCI arbiter has established a delayed transaction. However, during a delayed transaction, a write operation could be performed. Accordingly, a write operation increases the probability of making forward progress. That is, if a write cannot make forward progress, then a read will not either. Note that once an arbitration cycle has been initiated, the arbitration module 215 of FIG. 3 may "freeze" on that agent until the command is completed. This is to remove the possibility of thrashing the memory controller and potentially starving reads at the expense of writes.

Figure 6:
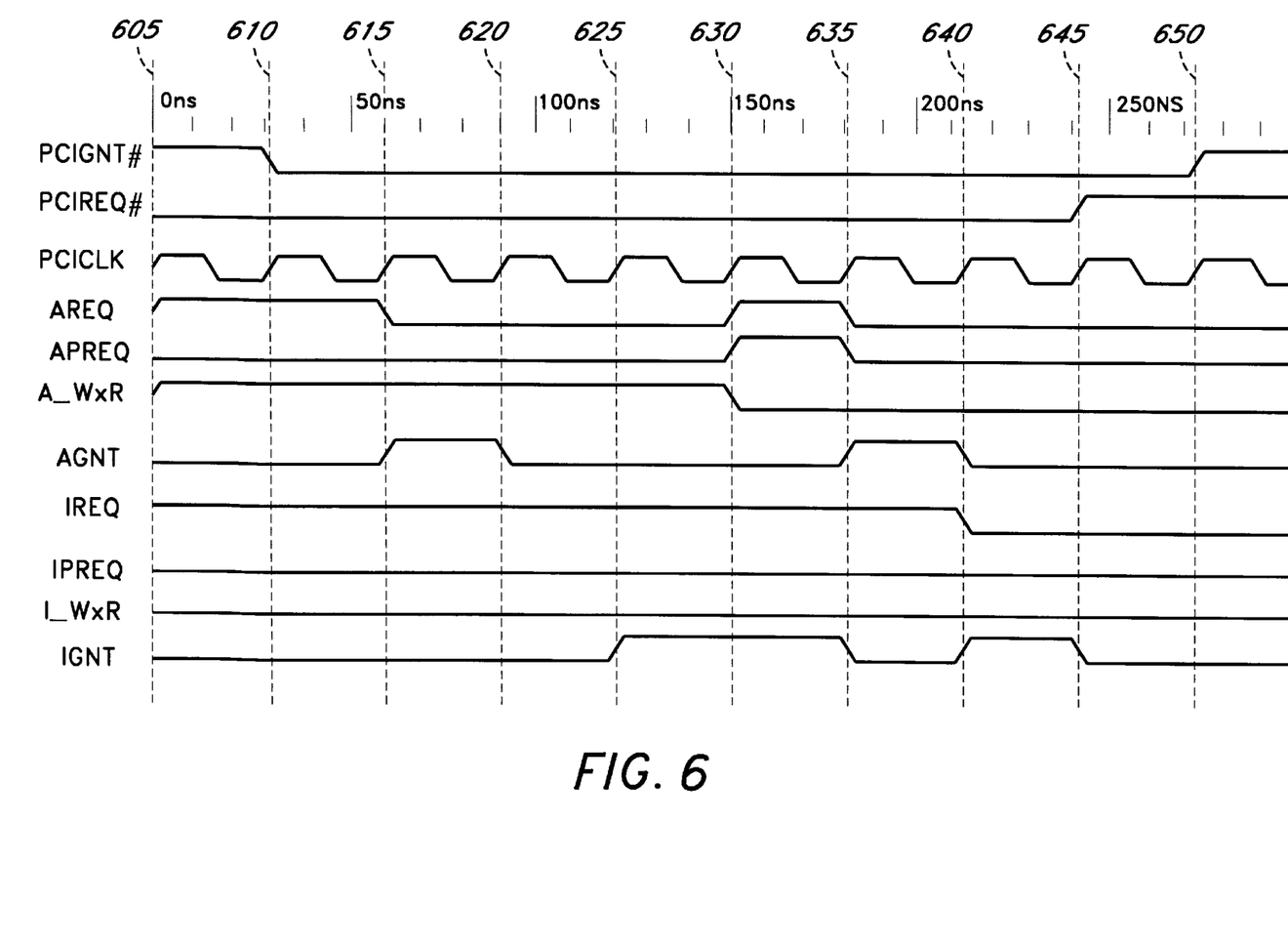
FIG. 6 illustrates an exemplary timing diagram of various signals of the arbitration module of FIG. 2.

FIG. 6 illustrates an exemplary timing diagram of various signals of the arbitration module 215 of FIG. 2. Referring to FIGS. 2, 3, and 6, at time 605, both AREQ and IREQ requests are asserted with the async DMA engine 330 requesting a write operation (A_W×R is high) and the isoc DMA engine 340 requesting a read operation (I_W×R is low). At substantially the same time, the arbitration module 215 assert PCIREQ# to request access to the PCI bus 130. At time 610, a PCI arbiter (e.g., the north bridge 115 of FIG. 1) asserts PCIGNT# to grant the request to access the PCI bus 130. In response to the assertion of PCIGNT#, the arbitration module 215, at time 615, asserts AGNT to give the async DMA engine 330 access to the PCI bus 130 since it is performing a write operation and the async request is the first request following a PCI grant of an arbitration cycle. At substantially the same time, the async DMA engine 330, deasserts AREQ to indicate that there are no further requests after the current operation. The async DMA engine 330 performs and completes the write operation at time 620. However, the isoc request needs to be serviced since IREQ is still asserted. As such, at time 625, the arbitration module 215 asserts IGNT to grant the isoc DMA engine 340 access to the PCI bus 130. Note that this request is not the first request after a PCI grant of the current arbitration cycle and thus, normal priority is based purely on the priority solver 400 of FIG. 4A.

At time 630, before the isoc DMA engine 340 is able to complete the read operation, the async DMA engine 330 asserts APREQ which preempts any other request. Accordingly, at time 635, IGNT is deasserted and AGNT is asserted which now gives the async DMA engine 330 access to the PCI bus 130 (note that this illustrates the first functionality provided by the arbitration module 215). Once the async DMA engine 330 performs the higher priority operation, at time 640, AGNT is deasserted and IGNT is once again asserted so that the isoc DMA engine 340 can complete the read operation. Note also that at time 640, IREQ is deasserted indicating that the isoc DMA engine 340 has no more requests pending after the current operation. At time 645, the isoc DMA engine 340 completes the operation and IGNT is deasserted. Since no more requests are asserted at time 645, the arbitration module 215 deasserts PCIREQ# to relinquish ownership of the PCI bus 130. At time 650, the PCI arbiter deasserts PCIGNT# to end the current PCI arbitration cycle.

Figure 7:
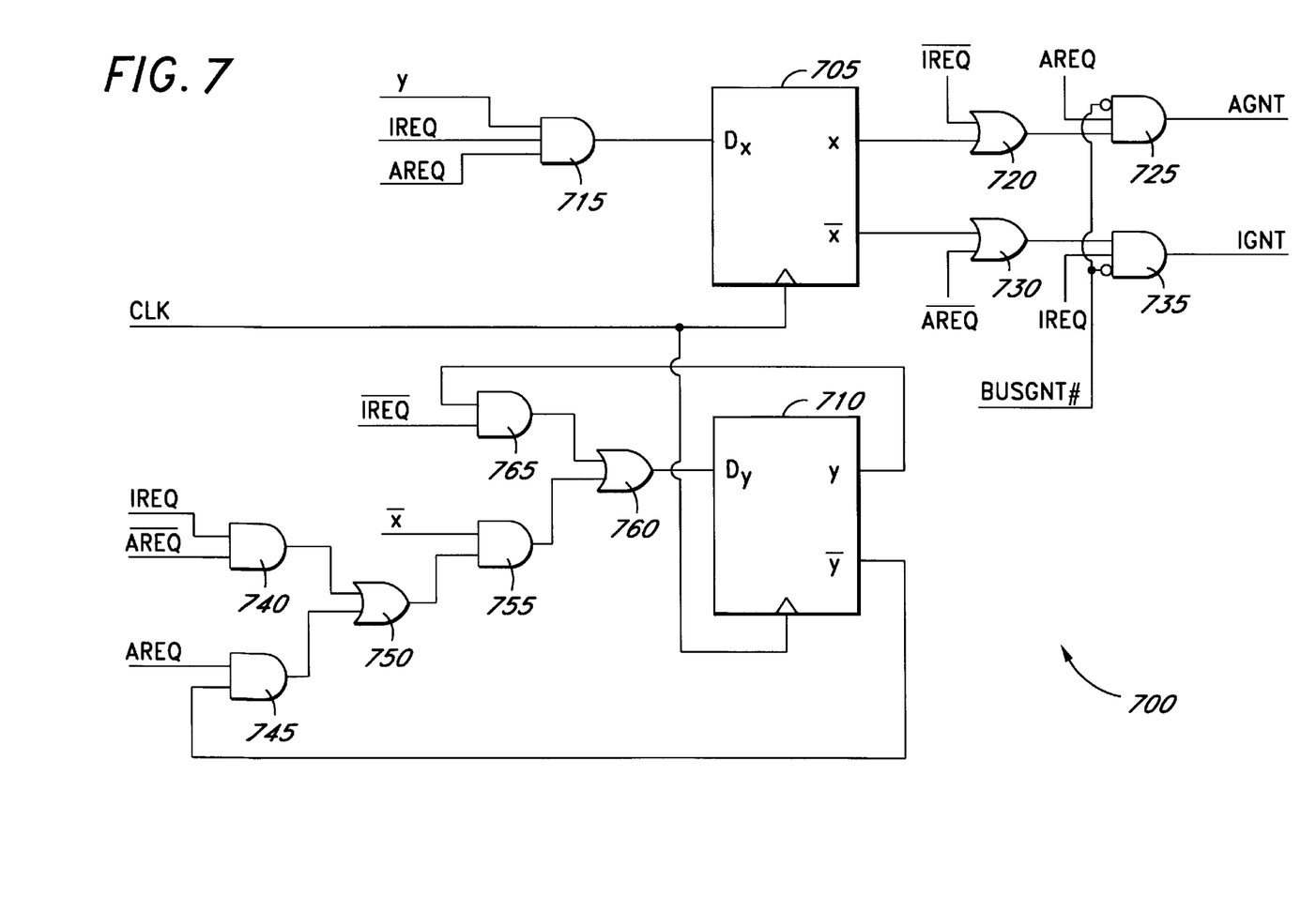
FIG. 7 illustrates an exemplary embodiment of a priority solver circuit implemented within the arbitration module.

FIG. 7 illustrates an exemplary embodiment of a priority solver circuit 700 implemented within the arbitration module 215. Referring to FIG. 7, the priority solver circuit 700 includes flip-flops 705 and 710 ("FFs") which are D-type FFs. During a reset condition, the outputs (X) and (Y) of FFs 705 and 710 are initialized to zero. The inputs to the circuit are the AREQ, IREQ, and CLK signals, although the priority solver circuit 700 may be implemented without a clock signal (e.g., using combinational logic). The outputs of the circuit are AGNT and IGNT. The output (Y) of FF 710, AREQ, and IREQ are applied to a first logic circuit 715 functioning as an AND gate, the output of which is coupled to the input of FF 705. A first set of logic circuits 740, 745, 755, and 765 functioning as AND gates and a second set of logic circuits 750 and 760 functioning as OR gates are coupled to the input of FF 710. AGNT is generated by a second logic circuit including OR gate 720 and AND gate 725 and IGNT is generated by a third logic circuit including OR gate 730 and AND gate 735. In operation, outputs AGNT and IGNT are never asserted simultaneously. With both X and Y equal to zero, if either input AREQ or IREQ is asserted, X and Y become 0 and 1, respectively, with the output IGNT being asserted if IREQ is a one or the output AGNT being asserted if AREQ is a one and IREQ is a zero (assuming that a BUSGNT# signal is asserted). With X and Y equal to 0 and 1, if both AREQ and IREQ are asserted, X and Y become 1 and 0, respectively, with IGNT becoming a one. With X and Y equal to 1 and 0, if both AREQ and IREQ are both asserted again, X and Y become 0 and 0, respectively, with AGNT becoming a one.

The arbitration mechanism of the present invention includes numerous advantages. First, by prioritizing writes over reads in a first PCI transaction following a grant of an arbitration cycle allows forward movement on write operations even when a delayed transaction is pending. Prior art implementations do not prioritize writes over reads the first time an agent is granted access to the system bus. Not prioritizing writes over reads may result in a wasted arbitration cycle when the read is retried, forcing the PCIREQ# to be deasserted. Note that agents requesting access to the PCI bus generally do not have knowledge that a delayed transaction has been established in the PCI arbiter. The PCI bus does not explicitly indicate the state of the agent that is initiating a retry.

Second, the arbitration module of the present invention differentiates between asynchronous and isochronous data streams which enables the arbitration module to prioritize the guaranteed throughput devices adequate access to the system bus. Third, the capability to assert an internal priority request within a "south bridge" device is currently not implemented in prior art "south bridge" devices. The internal requests in the prior art "south bridge" devices are presented as normal requests. Allowing higher priority requests internally to the "south bridge" provides for more effective use of the system bus, as the agent with the most critical service need is granted access to the system bus.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of arbitrating between first and second data streams, comprising the steps of:
   a) detecting a first type of request and a second type of request; and
   b) if the first type of request is for a write operation,
      b.1) performing the write operation in response to the first type of request, otherwise if the second type of request is for a write operation,
      b.2) performing the write operation in response to the second type of request, otherwise
      b.3) performing a read operation in response to the first type of request.

2. The method of claim 1, wherein prior to step b), the method comprises the steps of:
   asserting a bus request to access the bus; and
   receiving a grant for an arbitration cycle to access the bus.

3. The method of claim 1, wherein prior to step b), the method includes the step of granting the first type of request priority to access the bus over the second type of request.

4. The method of claim 1 further comprising the step of c) granting the first type of request priority to access the bus over the second type of request.

5. The method of claim 1, wherein prior to step b), the method including the step of:
   if at a first state,
      giving the first type of request priority to access the bus, and moving to a second state;
   if at the second state,
      giving the first type of request priority to access the bus, and moving to a third state; and
   if at the third state,
      giving the second type of request priority to access the bus, and moving to the first state.

6. The method of claim 1 wherein the first type of request is an asynchronous request and the second type of request is an isochronous request.

7. The method of claim 1 wherein the first type of request is an isochronous request and the second type of request is an asynchronous request.

8. A method of arbitrating between asynchronous and isochronous data streams, comprising the steps of:
   a) detecting an assertion of an asynchronous request and an isochronous request;
   b) if the isochronous request is for a write operation,
      b.1) performing a write operation in response to the isochronous request, otherwise
      if the asynchronous request is for a write operation, b.2) performing a write operation in response to the asynchronous request, otherwise b.3) performing a read operation in response to the isochronous request.

9. The method of claim 8, wherein prior to step b), the method comprises the steps of:

asserting a bus request to access the bus; and receiving a grant for an arbitration cycle to access the bus.

10. The method of claim 8, wherein prior to step b), the method comprises the step of giving the isochronous request priority over the asynchronous request to access the bus.

11. The method of claim 8 further comprising the step of c) giving the isochronous request priority over the asynchronous request to access the bus.

12. The method of claim 8, wherein prior to step b), the method includes the step of:

if at a first state,
    giving the isochronous request priority to access the bus, and moving to a second state;

if at the second state,
    giving the isochronous request priority to access the bus, and moving to a third state; and if at the third state,
    giving the asynchronous request priority to access the bus, and moving to the first state.

13. The method of claim 8, wherein step b) comprises the step of:

b) if the isochronous request is for a write operation,
    b.1) performing a write operation for the isochronous data stream in response to the isochronous request, otherwise
    if the asynchronous request is for a write operation,
    b.2) performing a write operation for the asynchronous data stream in response to the asynchronous request, otherwise
    b.3) performing a read operation for the isochronous data stream in response to the isochronous request.

14. A method of arbitrating between asynchronous and isochronous data streams, comprising the steps of:

a) detecting an asynchronous request and an isochronous request;

b) if the asynchronous request is for a write operation,
    b.1) performing a write operation in response to the asynchronous request, otherwise
    if the isochronous request is for a write operation,
    b.2) performing a write operation in response to the isochronous request, otherwise
    b.3) performing a read operation in response to the asynchronous request.

15. The method of claim 14, wherein prior to step b), the method comprises the steps of:

asserting a bus request to access the bus; and receiving a grant for an arbitration cycle to access the bus.

16. The method of claim 14, wherein prior to step b), the method includes the step of giving the isochronous request priority over the asynchronous request to access the bus.

17. The method of claim 14 further comprising the step of c) giving the isochronous request priority over the asynchronous request to access the bus.

18. The method of claim 14, wherein prior to step b), the method includes the step of:

if at a first state,
    giving the isochronous request priority to access the bus, and moving to a second state;

if at the second state,
    giving the isochronous request priority to access the bus, and moving to a third state; and if at the third state,
    giving the asynchronous request priority to access the bus, and moving to the first state.

19. The method of claim 14, wherein step b) comprises the step of:

b) if the asynchronous request is for a write operation,
    b.1) performing a write operation for the asynchronous data stream in response to the asynchronous request, otherwise
    if the isochronous request is for a write operation,
    b.2) performing a write operation for the isochronous data stream in response to the isochronous request, otherwise
    b.3) performing a read operation for the asynchronous data stream in response to the asynchronous request.

20. An apparatus to arbitrate between first and second data streams, comprising:

a first module to assert a first type of request;

a second module to assert a second type of request; and an arbitration module coupled to the first and second modules, said arbitration module, during a first bus transaction following a grant of an arbitration cycle, to allow (i) said first module to perform a write operation if the first type of request is for a write operation, otherwise (ii) said second module to perform a write operation if the second type of request is for a write operation, and otherwise (iii) said first module to perform a read operation.

* * * * *